Figure 4:
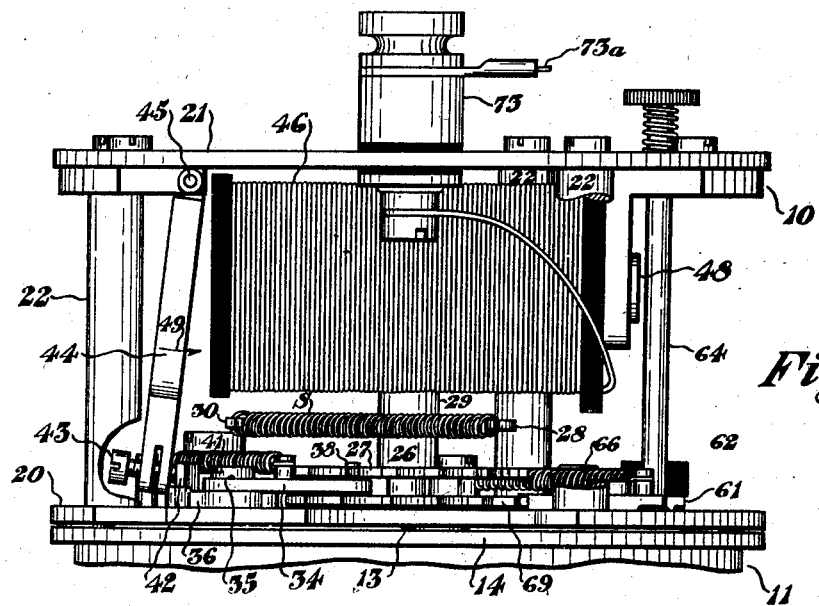

Sept. 23, 1930.  I. A. AUNGST  1,776,674
ELECTRICALLY ENERGIZED SPRING MOTOR
Filed Sept. 14, 1928  2 Sheets-Sheet 1
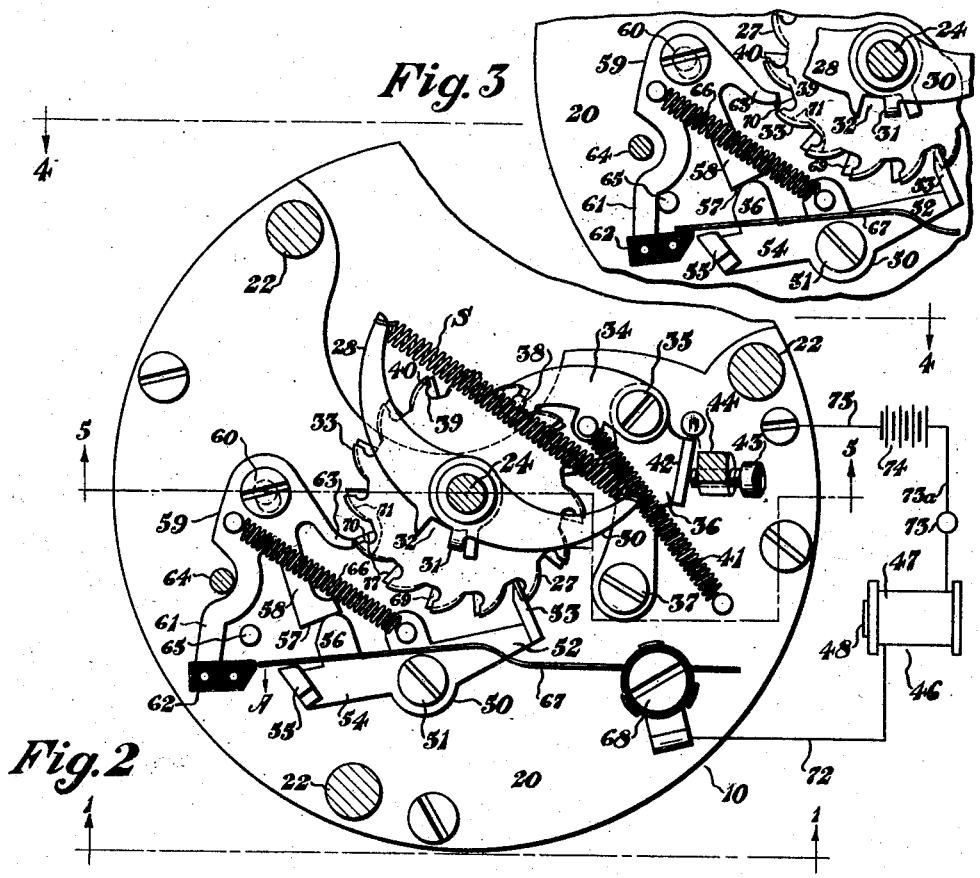
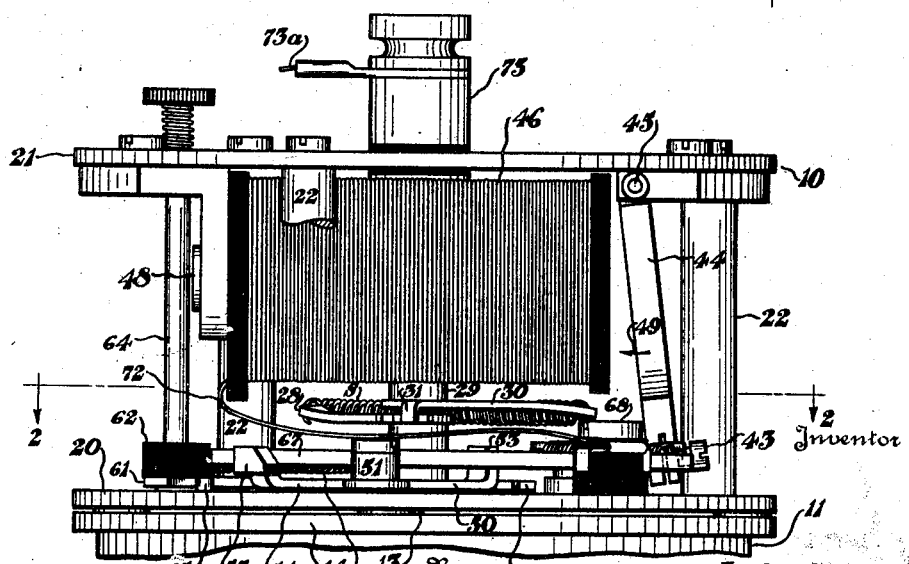
Inventor
I. A. Aungst
By Harry Frease
Attorney Sept. 23, 1930.   I. A. AUNGST   1,776,674
ELECTRICALLY ENERGIZED SPRING MOTOR
Filed Sept. 14, 1928   2 Sheets-Sheet 2

Inventor
I. A. Aungst
By Harry Frease
Attorney

Patented Sept. 23, 1930

1,776,674

UNITED STATES PATENT OFFICE

IRA A. AUNGST, OF CANTON, OHIO, ASSIGNOR TO WILLIAM W. BILLINGS, OF ROCKY RIVER, OHIO

ELECTRICALLY-ENERGIZED SPRING MOTOR

Application filed September 14, 1928. Serial No. 306,060.

My invention relates to spring motors particularly adapted for use as drive units for electric watches and clocks, as well as for use in suitable sizes as motor driving units for any other desired mechanisms or machines.

More particularly my invention comprises improvements in the electrically energized spring motors set forth in the application of William W. Billings, for electric watches and clocks, filed November 18, 1927, Serial No. 234.212, and in Patent No. 1,315,459, for self-winding spring motor, issued to William W. Billings September 9, 1919.

The objects of the present invention include the simplification and improvement of the construction and arrangement of electrically energized spring motors, and particularly spring motors including the improvements set forth in the aforesaid application and patent of William W. Billings, whereby the spring motors of the present invention are easier and more economical to manufacture, are more reliable and certain in their operation, and are subject to less maintenance than has been the case with electrically energized spring motors for similar services which have heretofore been used.

Most electrically energized spring motors include an electro-magnet, a spring, a drive shaft, a battery or the like, and an automatic switch, the spring being intermittently energized by the electro-magnet for turning the drive shaft for a predetermined time, and the switch being cooperatively connected with the drive shaft and the magnet to make and break an electric circuit through the magnet and the battery at the proper times for intermittently energizing the spring.

More particularly, the objects of the present improvements include the provision of simplified and more efficient mechanism between the electro-magnet and the spring for intermittently energizing the spring, a simplified and more efficient switch mechanism, together with a simplified and more efficient arrangement of the other detail parts of the spring motor.

Figure 5:
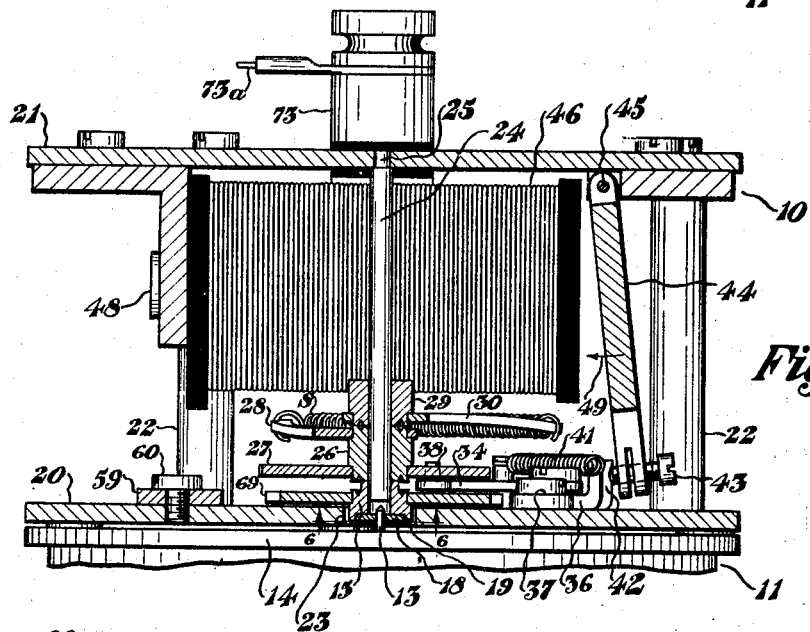

These and ancillary objects are attained in the improved electrically energized spring motor comprising the present invention, a preferred embodiment of which is hereinafter set forth in detail and is illustrated in the accompanying drawings forming part hereof, in which Figure 1 is a fragmentary side view of the improved electrically energized spring motor, illustrated as being used for driving an electric watch, as in the direction of the arrows 1—1, Fig. 2;

Fig. 2, a fragmentary plan sectional view thereof as on line 2—2, Fig. 1, the various elements of the improved switch mechanism being illustrated in their positions when the circuit is just about to be closed, and certain of the electrical parts of the motor being illustrated diagrammatically;

Fig. 3, a fragmentary view similar to Fig. 2, illustrating the positions of the various switch elements when the circuit is open and during the period when the energy stored in the spring is being utilized to drive the shaft;

Fig. 4, a side view of the motor as in the direction of the arrows 4—4, Fig. 2;

Fig. 5, a sectional view of the motor as on line 5—5, Fig. 2; and

Figure 6:
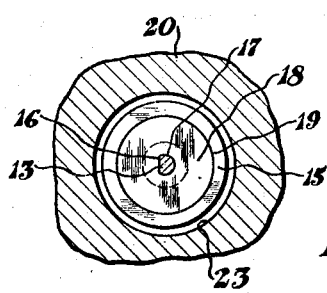

Fig. 6, a fragmentary sectional view thereof as on line 6—6, Fig. 5.

Similar numerals refer to similar parts throughout the drawings.

The improved electrically energized spring motor indicated generally at 10 in the preferred embodiment, is illustrated as driving a watch or clock movement of any desired construction indicated at 11, the watch movement including a drive spindle 13 extending outwardly through the back plate 14 thereof and separably connected with the drive sleeve 15 of the motor as by providing a flat surface 16 at one side of the outer end of the spindle 13 and inserting the irregularly outer shaped spindle end thus formed in a like shaped aperture 17 in a preferably steel disk 18 engaged by a force fit in a suitable counterbore 19 at the end of the sleeve 15.

The improved electrically energized spring motor 10, includes a front plate 20 and a back plate 21 spaced apart and secured in a usual manner by pillars 22, for forming a suitable mounting for the mechanisms of the motor.

The outer end of the drive sleeve 15 of the motor is arranged to rotate in a suitable aperture 23 in the motor front plate 20, and the sleeve 15 is secured as by a force fit upon a motor drive shaft 24 extending outwardly therefrom and having its outer end 25 of reduced diameter for fitting in a suitable aperture in the back plate 21.

A cam wheel bearing 26 is rotatably mounted on the body of the shaft 24 extending beyond the end of the drive sleeve 15, and a cam wheel 27 is secured upon the bearing 26.

A drive arm 28 is secured to the cam wheel bearing 26, and the cam wheel bearing 26 is preferably located between the drive sleeve 15 and a driven arm collar 29 secured upon the shaft 24, whereby the opposite ends of the drive sleeve 15 and the driven arm collar 29 provide end bearings for the cam wheel bearing 26 rotatably mounted on the shaft 24.

A driven arm 30 is secured to the driven arm collar 29, and for limiting the possible angular movement of the arms with respect to each other, one of the arms, as the arm 30, is provided with a tongue 31 which projects through a notch 32 in the other arm, as the arm 28.

The arms 28 and 30 are preferably curved and tapered as illustrated, and the ends thereof are connected by the helical main spring S, the curving of the arms permitting the use of a relatively long spring, the force of which is transmitted to the shaft substantially tangentially.

The main wheel 27 is provided with a plurality of like cam ratchet teeth 33 about its outer peripheral edge, and a drive pawl 34 is pivotally mounted at one end as at 35 at the outer end of a drive pawl actuating lever 36 which is pivotally mounted at its other end as at 37 upon the front plate 20 at one side of the shaft 24.

The outer end of the pawl 34 is preferably provided with a cylindric pin tongue 38 preferably extending towards the back plate 21, and arranged for successive engagement with the semicylindric bases 39 of the radial catch edges 40 of the ratchet cam teeth 33.

For normally urging the pawl pin tongue 38 against the ratchet cam teeth 33, and for other purposes, a tension spring 41 is connected at one end with the pawl 34 and at the other end with the front plate 20.

The drive pawl actuating lever 36 is provided with a tongue 42 preferably extending towards the back plate 21, for being impinged by an adjustable set screw 43 carried at the outer end of an armature 44 which is pivotally mounted between the plates 20 and 21 as by means of a pivot pin 45.

An electro-magnet 46, including one or more coils of wire 47 each wound on a suitable core 48, is secured between the plates and suitably insulated therefrom for actuating the armature, so that when the electro-magnet is energized the armature will be rotated in the direction of the arrow 49 whereby the drive pawl actuating lever 36 will be impinged by the screw 43 and rotated towards the shaft 24, and whereby when the electro-magnet is deenergized, the tension of the spring 41 will rotate the lever 36 and the armature 44 back to the positions illustrated in the figures.

As illustrated in the drawings, the electro-magnet 46, and the armature 44, are preferably mounted upon the back plate 21, whereby production is facilitated by permitting the assembly of the magnet and the armature on the back plate independently of the remaining parts of the motor, the armature and the drive pawl actuating lever 36 being adjustably separable as aforesaid, and not being secured to each other; although by reason of the construction and arrangement as aforesaid, the operation of the armature 44 and lever 36 is the same as if there were a positive pivotal connection between the ends of the adjustable set screw 43 and the lever 36.

An improved combined contact, detent, and trip catch resetting pawl 50 is pivotally mounted as at 51 preferably on the front plate 20 for operation about an axis parallel with the axis of the shaft 24, and the pawl 50 includes a cam wheel detent arm 52 extending from one side of the pivotal mounting and having a detent tongue 53 protruding therefrom for successive engagement behind the catch edges 40 of the ratchet cam teeth 33 for peventing retrograde rotation of the same when the electro-magnet 46 is not energized.

A switch contact arm 54 extends from the other side of the pivotal mounting of the pawl 50 and carries at its outer end a contact lug 55.

A trip catch resetting tongue 56 extends laterally from the switch contact arm 54 for abutment against the outer end 57 of the resetting arm 58 of a triple armed resetting trip catch 59 which is provided with a slot and pivot mounting as at 60 upon the front plate 20.

The triple armed resetting trip catch 59 includes at one side of the resetting arm 58, a trip catch arm 61 having a trip catch toe 62 of insulating material secured at its outer end. At the other side of the resetting arm 58, the resetting catch 59 is provided with a trip arm 63.

For limiting rotation of the resetting trip catch 59 to the left as viewed in Fig. 2, a stop shaft 64 may be provided, and this shaft may also serve as a setting shaft for the watch movement; and for limiting rotation of the resetting trip catch 59 to the right as viewed in Fig. 2, a stop pin 65 may be provided.

A tension spring 66 is connected at one end with the resetting trip catch 59 at a position thereon offset from the slot and pivotal mounting at 60, so that the catch will be normally urged to rotate towards the right as viewed in Fig. 2; and at the other end the spring 66 is connected to the pawl 50 at a position thereon offset from the pivotal mounting at 51, so that the pawl will be normally urged to rotate also to the right as viewed in Fig. 2.

One end of a spring contact arm 67 is secured and insulated from the plate 20 as at 68 and the other end extends between the contact lug 55 and the shaft 24, to a position for being engaged and disengaged by the trip catch toe 62 of insulating material, for intermittently contacting the spring arm with the contact lug for making and breaking a circuit for energizing and deenergizing the electro-magnet 46.

The drive sleeve 15 has secured thereon a switch cam 69 including a plurality of cam teeth 70 equal in number to the ratchet cam teeth on the cam wheel 27, and each cam tooth 70 on the switch cam includes a curved actuating edge 71 against which rides the end of the trip arm 63 of the resetting strip catch 59.

The spring contact arm 67 is electrically connected as by a conductor 72 with one terminal of the electro-magnet winding 47 of the electro-magnet 46, the other terminal 73 of the electro-magnet winding being connected by a conductor 73ᵃ with one terminal of a battery 74; and the other terminal of the battery is connected by a conductor 75 with any part of the motor, as for example the plate 20, to which are grounded all the other mechanical parts of the motor, with the exception of the spring contact arm 67.

The operation of the improved motor is as follows:

A resisting torque being applied to the drive sleeve 15 as by the drive spindle 13 of the watch movement, the usual escapement of the watch movement will permit clockwise rotation of the drive sleeve 15 and the shaft 24 secured thereto, if a suitable driving torque is applied to the shaft.

This driving torque is applied by means of the helical spring S connecting the drive arm 28 secured to and rotating with the cam wheel bearing 26 and cam wheel 27, and the driven arm 30 secured to and rotating with the driven arm collar 29 and the shaft 24; whereby the drive arm being as aforesaid secured to the cam wheel 27, and a reaction against retrograde rotation of the cam wheel 27 being always provided either by the pawl detent tongue 53 or the drive pawl pin tongue 38, the helical spring S connecting the arms, being energized by stretching the spring between the arms, will apply the necessary driving torque to the arm 30 and the drive sleeve 15 secured thereto.

As the spring S becomes deenergized and the torque applied thereby decreases the angle between the arms 28 and 30, in order to maintain a substantially constant torque on the drive sleeve 15, it is only necessary to intermittently increase the angle between the arms 28 and 30, thereby reenergizing the spring S.

Such intermittent reenergizing of the spring is accomplished by the mechanisms of the present improvements in the following manner:

Fig. 3, illustrates the position of the spring contact arm 57 as maintained out of contact with the pawl contact lug 55 during the deenergizing of the spring S when the arm 28 is maintained stationary.

As the spring S draws the arm 30 towards the arm 28, the curved edge 71 of one of the teeth 70 on the switch cam 69, oscillates the trip catch 59 by the trip arm 63, so that the outer end of the spring contact arm 67 finally slips from engagement with the trip catch toe 62 and makes contact with the pawl contact lug 55.

In Fig. 2, the spring contact arm 67 has just slipped from engagement with the catch toe 62 and is rotating by reason of its spring energy in the direction of the arrow A, and is just about to make contact with the contact lug 55.

After contact has been made between the spring contact arm 67 and the contact lug 55, the circuit is closed through the battery 74 and the winding 47 of the electro-magnet. The electromagnet is thus energized and rotates the armature 44 towards the shaft 24, about the pivot pin 45, and through impingement of the screw 43 against the tongue 42 of the drive pawl actuating lever 36, the drive pawl actuating lever and the drive pawl 34 are rotated to the left as viewed in Fig. 2, thereby rotating the cam wheel 27 a fraction of a revolution depending upon the number of cam teeth therein.

As the cam wheel rotates, the detent arm 52 is swung outwardly from the shaft 24 by the curved edge 76 of a cam tooth 33, whereby the arm 54 simultaneously moves the spring contact arm 67 towards the shaft 24; and, through the resetting tongue 56, the arm 54 bodily moves, by reason of the slot and pivotal mounting 60, the trip catch 59 from the position illustrated in Fig. 2 to the reset position illustrated in Fig. 3 behind the catch edge 77 of the tooth 70, simultaneously rotating the trip catch to the right as illustrated in Fig. 2, whereby the catch toe 62 will reengage one side of the end of the spring contact arm 67, maintaining the arm out of contact with the contact lug 55 of the pawl 50, which has now assumed the position illustrated in Fig. 3.

The various mechanisms of the motor are then ready for a repetition of the above described cycle of movements.

I claim:—

1. An electrically energized spring motor including an electro-magnet, a spring, a drive shaft, and a switch, the electro-magnet being arranged for electrical connection with a battery and the switch, an armature mounted for movement when the magnet is energized and arranged to energize the spring by said movement, the spring being adapted when energized for turning the shaft, and the switch being operated by rotation of the shaft to close an electric circuit through the magnet and the battery when the spring has become deenergized to a predetermined degree, means actuated by movement of the armature when the magnet is energized to open the circuit, and a mounting frame including separable spaced plates, the magnet and the armature being secured upon one of the plates, and the remaining parts of the motor being secured on the other plate.

2. An electrically energized spring motor including an electro-magnet, a spring, a drive shaft, and a switch, the electro-magnet being arranged for electrical connection with a battery and the switch, an armature mounted for movement when the magnet is energized and arranged to energize the spring by said movement, the spring being adapted when energized for turning the shaft, and the switch being operated by rotation of the shaft to close an electric circuit through the magnet and the battery when the spring has become deenergized to a predetermined degree, means actuated by movement of the armature when the magnet is energized to open the circuit, and a mounting frame including separable spaced plates, the magnet and the armature being secured upon one of the plates, and the remaining parts of the motor being secured on the other plate and separable from the armature.

3. An electrically energized spring motor including an electro-magnet, a spring, a drive shaft, and a switch, the electro-magnet being arranged for electrical connection with a battery and the switch, an armature mounted for movement when the magnet is energized and arranged to energize the spring by said movement, the spring being adapted when energized for turning the shaft, and the switch being operated by rotation of the shaft to close an electric circuit through the magnet and the battery when the spring has become deenergized to a predetermined degree, means actuated by movement of the armature when the magnet is energized to open the circuit, and a mounting frame including spaced plates, the magnet and the armature being secured upon one of the plates, and the remaining parts of the motor being secured on the other plate.

4. An electrically energized spring motor including an electro-magnet, a spring, a drive shaft, and a switch, the electro-magnet being arranged for electrical connection with a battery and the switch, an armature mounted for movement when the magnet is energized and arranged to energize the spring by said movement, the spring being adapted when energized for turning the shaft, and the switch being operated by rotation of the shaft to close an electric circuit through the magnet and the battery when the spring has become deenergized to a predetermined degree, means actuated by movement of the armature when the magnet is energized to open the circuit, and a mounting frame including spaced plates, the magnet and the armature being secured upon one of the plates, and the remaining parts of the motor being secured on the other plate and separable from the armature.

5. An electrically energized spring motor including a drive shaft, a driven arm extending from and secured to the shaft, a drive arm rotatable on the shaft, a spring connecting the arms, means for intermittently energizing the spring, the arms being curved for permitting a relatively great length for the spring.

6. An electrically energized spring motor including a drive shaft, a driven arm extending from and secured to the shaft, a drive arm rotatable on the shaft, a spring connecting the arms, means for intermittently energizing the spring, the arms being curved and concave towards each other for permitting a relatively great length for the spring.

7. An electrically energized spring motor including a drive shaft, a driven arm extending from and secured to the shaft, a drive arm rotatable on the shaft, a spring connecting the arms, means for intermittently energizing the spring, and means for limiting the angular movement of the arms with respect to each other.

8. An electrically energized spring motor including a drive shaft, a driven arm extending from and secured to the shaft, a drive arm rotatable on the shaft, a spring connecting the arms, means for intermittently energizing the spring including a ratchet cam wheel secured to the drive arm, a pawl pivotally mounted at one side of the drive shaft, and means for intermittently operating the pawl to intermittently increase the angle between the arms.

9. An electrically energized spring motor including a drive shaft, a driven arm extending from and secured to the shaft, a drive arm rotatable on the arm, a spring connecting the arms, and means for intermittently increasing the angle between the arms including an electro-magnet, an armature therefor, means connecting the armature and the drive arm for rotating the arm by movement of the armature, a contact arm adapted for being connected in series with the winding of the electro-magnet and one terminal of a battery, a contact lug adapted for being connected with the other terminal of the battery, a resetting trip catch arranged for engagement and disengagement with the contact arm for maintaining the arm out of contact with the lug during the deenergizing of the spring, the catch being actuated by the shaft to disengage the arm for contacting with the lug at a predetermined period, and the lug being mounted for movement by the drive arm to reengage the arm with the catch and break contact between the lug and the arm.

In testimony that I claim the above, I have hereunto subscribed my name.

IRA A. AUNGST.